United States Patent Office 3,686,172
Patented Aug. 22, 1972

3,686,172
DERIVATIVES OF 7-(5-AMINOTETRAZOLYLACE-TYLAMINO)-CEPHALOSPORANIC ACID
Hans Bickel, Binningen, Johannes Mueller, and Rolf Bosshardt, Arlesheim, Heinrich Peter, Riehen, and Bruno Fechtig, Reinach, Basel-Land, Switzerland, assignors to Ciba-Geigy Corporation
No Drawing. Filed Dec. 8, 1969, Ser. No. 883,334
Claims priority, application Switzerland, Dec. 12, 1968, 18,516/68; Apr. 23, 1969, 6,150/69
Int. Cl. C07d *99/24*
U.S. Cl. 260—243 C     5 Claims

ABSTRACT OF THE DISCLOSURE

7 - (5 - aminotetrazolylacetylamino)-cephalosporanic acid and derivatives thereof. Use: antibiotics.

---

The subject of the present invention is the manufacture of new therapeutically active derivatives of 7-aminocephalosporanic acid (ACA) of Formula I

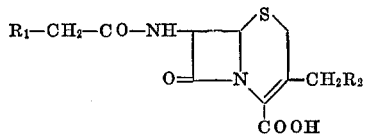

wherein $R_1$ denotes a 5-aminotetrazolyl residue and $R_2$ is hydrogen or a free hydroxyl group or a hydroxyl group esterified by a carboxylic acid, in which ester oxygen atoms can be replaced by sulphur atoms, and optionally an N-substituted carbamoyloxy group in which oxygen atoms can be replaced by sulphur, or a quaternary amino group, and its salts, which may be internal salts.

An esterified hydroxyl group $R_2$ in which the oxygen atoms can be replaced by sulphur is derived from a carboxylic acid and is for example a lower alkanoyloxy group which is optionally substituted, for example by halogen atoms, especially chlorine, such as formyloxy, propionyloxy, butyryloxy, pivaloyloxy or chloracetoxy, especially acetoxy, or a monocyclic or dicyclic arylcarbonyloxy or arylthiocarbonyloxy, arylcarbonylmercapto or arylthiocarbonylmercapto group which is optionally substituted, for example by lower alkyl, lower alkoxy or lower alkylmercapto residues, halogen atoms or the nitro group, especially the benzoylmercapto group.

$R_2$ can also be an optionally substituted carbamoyloxy group, for example a group of formula

—O—CO—NH—$R_3$ wherein $R_3$ represents hydrogen or an aliphatic, aromatic, araliphatic or heterocyclic residue, especially a straight-chain or branched lower alkyl residue which is unsubstituted or substituted, preferably substituted by one or more lower alkoxy groups or halogen atoms, such as the methyl, ethyl, but above all the β-chlorethyl, residue.

$R_2$ can furthermore be a thiocarbamoylmercapto group of formula

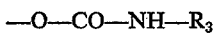

wherein $R_3$ has the abovementioned significance and $R_4$ represents hydrogen or $R_3$.

$R_2$ furthermore denotes a quaternary amino group in which the quaternary nitrogen atom for example forms part of an aromatic ring such as of a quinoline, isoquinoline or pyrimidine ring, but especially of an unsubstituted or substituted pyridine ring, for example of formula

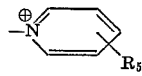

wherein $R_5$ represents hydrogen or one or more lower alkyl, lower alkoxycarbonyl, carbamoyl or carboxyl groups or one or more halogen atoms.

The salts of the new compounds are metal salts, above all those of therapeutically usable alkali or alkaline earth metals such as sodium, potassium, ammonium or calcium, or salts with organic bases, for example triethylamine, N-ethylpiperidine, dibenzylamine, N-benzyl-β - phenethylamine, N,N' - dibenzylethylene diamine, ethanolamine, diisopropylamine, procaine or ephenamine.

If $R_2$ is basic, internal salts can form.

The new compounds show a particularly good antibacterial action. They are active both against gram-positive and above all also against gram-negative bacteria, for example against penicillin-resistant *Staphylococcus aureus, Escherichia coli, Klebsiella pneumoniae, Salmonella typhosa* and *Bacterium proteus*, as is also found in animal experiments, for example on mice. In these, 0.1–100 mg./kg. are chemotherapeutically active on subcutaneous use, depending on the nature of the bacterial infection. The compounds can therefore be used for combatting infections which are caused by such micro-organisms, and furthermore as fodder additives, for the preservation of foodstuffs or as disinfectants. Compounds in which $R_2$ is the acetoxy group, the β-chlorethylcarbamoyl group or a pyridinio group which is unsubstituted or substituted as mentioned above are particularly valuable.

The compounds of the present invention can be manufactured according to methods which are in themselves known. Thus they are obtained if (a) a compound of Formula II

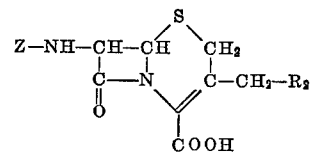

wherein Z represents a halogenacetyl residue such as the fluoracetyl, chloracetyl, iodacetyl or above all bromacetyl residue and $R_2$ is hydrogen or a free or esterified hydroxyl group (it being possible for oxygen atoms in the ester group to be replaced by sulphur atoms) is reacted with 5-aminotetrazole, or (b) a compound of Formula II, wherein Z represents hydrogen and $R_2$ is hydrogen or a free or esterified hydroxyl group (it being possible for oxygen atoms in the ester group to be replaced by sulphur atoms) is acylated by the group $R_1$—$CH_2$—CO— in which $R_1$ has the meaning given above, and, if desired, resulting compounds in which $R_2$ represents the acetoxy group are converted to compounds with a free hydroxyl group $R_2$ and compounds having a free hydroxyl group $R_2$ are converted into compounds which contain a different ester group than the acetoxy group (in which oxygen atoms can optionally be replaced by sulphur atoms) or into an optionally N-substituted carbamoyloxy group in which oxygen atoms can be replaced by sulphur atoms and, if desired, the group $R_2$ in resulting compounds in which $R_2$ represents a hydroxyl group esterified by a carboxylic acid (in which ester oxygen atoms can be replaced by sulphur atoms) is replaced by a quaternary amino group and where appropriate, if desired, the resulting compounds are converted to their therapeutically usable metal salts such as alkali metal or alkaline earth metal salts or salts with ammonia or organic bases or the free carboxylic acids, or, where appropriate, internal salts are formed from resulting salts.

The reaction of the Compound II wherein Z represents a halogenacetyl group with 5-amino-tetrazole takes place at room temperature or at slightly elevated or lowered temperature, preferably at 20–40° C. It is preferably carried out in an inert organic solvent such as methylene chloride, chloroform, carbon tetrachloride, tetrahydrofurane, dioxane, dimethylformamide or acetonitrile in the presence of a reagent which bonds hydrogen halide, for example a weak inorganic base such as an alkali carbonate, alkali bicarbonate or alkali acetate or a tertiary amine, especially a tri-lower alkylamine, preferably diisopropylethylamine (Hünig base).

The acylation of the Compound II wherein Z represents hydrogen is performed in the manner known for the acylation of aminoacids, for example by means of an acid halide, especially acid chloride, or acid azide or of an acid anhydride, especially a mixed anhydride, for example a mixed anhydride formed with mono-esterified carbonic acid, pivalic acid or trichloracetic acid, or with the free acid itself, in the presence of a condensation agent such as a carbodiimide, for example dicyclohexylcarbodiimide. The acylation of the Compound II can also be performed by first silylating or stannylating the Compound II, wherein Z represents hydrogen, acylating the silylation or stannylation product with the acid or with a reactive acid derivative which contains the group $R_1$—$CH_2$—CO—, and splitting off silyl or stannyl groups which may be present by means of alcohol or water; compare for example British patent specification No. 1,073,530 and Netherlands application No. 6717107.

The cephalosporine derivatives used as starting substances are known or can be manufactured according to processes which are in themselves known. Compounds of Formula II wherein Z represents hydrogen and R is a different ester group than the acetoxy group are advantageously manufactured according to the process described in U.S. application Ges. No. 739,628 (Case 6300/6217).

The conversion of the compound of Formula I wherein R represents the acetoxy group into a compound having a free hydroxyl group, and its esterification with other acids than acetic acid or its conversion into carbamoyl derivatives or compounds wherein R is a quaternary amino group takes place in a manner which is in itself known.

The invention also relates to those embodiments of the process according to which one starts from a compound obtainable as an intermediate at any stage of the process and carries out the missing process stages, or in which the process is stopped at any stage, or in which the starting substances are formed under the reaction conditions, or in which the reaction components are optionally present in the form of their salts.

The new compounds are useful as medicines, for example in the form of pharmaceutical preparations. These contain the compounds mixed with a pharmaceutical organic or inorganic, solid or liquid excipient which is suitable for enteral, topical or parenteral administration. Suitable substances for the formation of the excipients are those which do not react with the new compounds such as for example water, gelatines, lactose, starch, stearyl alcohol, magnesium stearate, talc, vegetable oils, benzyl alcohols, gum, propylene glycol, polyalkylene glycol, white petroleum jelly, cholesterol or other known medicinal excipients. The pharmaceutical preparations can for example be in the form of tablets, dragées, ointments, creams or capsules or in a liquid form as solutions, suspensions or emulsions. They are optionally sterilised and/or contain auxiliary substances such as preservatives, stabilisers, wetting agents or emulsifiers, solubilising agents or salts for regulating the osmotic pressure or buffers. They can also contain other therapeutically valuable substances. The preparations are obtained according to usual methods.

The invention is described in the following examples.

The following systems are used in thin layer chromatography on silica gel plates:

System 52=n-butanol-glacial acetic acid-water (75:7.5:21)

System 101A=n-butanol-pyridine-glacial acetic acid water (42:24:4:30).

In the examples, "MIC" means the minimum inhibitory concentration which is measured by the gradient plate test described in "Antibiotics" vol. I by Gottlieb and Shaw, New York 1967, p. 508. The MIC is determined on strains of *Staphylococcus aureus* SG 511 (sensitive to penicillin) or *Staphylococcus aureus* 2999 (resistent to penicillin), *Bacillus subtilis, Bacillus megatherium, Escherichia coil* 2018, *Klebsiella pneumoniae* and/or *Salmonella typhimuri*.

EXAMPLE I 7.86 g. of bromacetylamino-cephalosporanic acid are dissolved in 40 ml. of methylene chloride with the addition of 6.9 ml. of N,N-diisopropylethylamine. A solution prepared by dissolving 2.46 g. of 5-aminotetrazole monohydrate in 20 ml. of dimethylformamide and subsequent dilution with 30 ml. of methylene chloride, is added. The solution is rinsed down with 10 ml. of methylene chloride.

After 45 hours the methylene chloride is distilled off as completely as possible at a water-jet vacuum and the dimethylformamide at a temperature of 30° C. under 0.3 mm. pressure of mercury. The remaining thick oil is dissolved in 100 ml. of water, covered with 200 ml. of ethyl acetate and the pH of the aqueous phase adjusted to 5.4 with 2 N sodium carbonate solution with repeated agitation. After separation, the aqueous phase is extracted a second time with 200 ml. of ethyl acetate. The organic phases are washed twice with 20 ml. of buffer of pH 6 each time and then discarded. The combined aqueous solutions are covered with 800 ml. of ethyl acetate and the pH value adjusted to 1.8 by means of 2 N hydrochloric acid with agitation. After separating the phases, the aqueous phase is covered with 400 ml. of ethyl acetate, saturated with sodium chloride and later on extracted again with 200 ml. of ethyl acetate. The ethyl acetate solutions are washed with 40 ml. of saturated sodium chloride solution, dried with sodium sulphate and evaporated to dryness in vacuo. 6.3 g. of this crude product are suspended in 36 ml. of methanol and dissolved by adding 7.7 ml. of 3 molar methanolic sodium α-ethyl-hexanoate solution. 4.5 ml. of absolute ethanol are added dropwise while stirring thoroughly. The impure precipitate is filtered off and discarded. The filtrate is treated in a similar manner with 300 ml. of absolute ethanol, cooled, and allowed to stand for 30 minutes at −10° C. The batch is filtered with suction, washed with 40 ml. of ethanol to yield the sodium salt of 7-[5-aminotetrazolyl-acetylamino]-cephalosporanic acid. The acid may be obtained by re-extraction in ethyl acetate at pH 2.

$Rf_{52}$=0.13, $Rf_{101A}$=0.36

$[\alpha]_D^{20}$=148°±1° (c.=1, in water, as sodium salt)

U.V. spectrum in water as sodium salt: $\lambda_{max}$: 227 mμ (ε=8350) and 260 mμ (ε=8200); NMR spectrum in deutero-dimethylsulphoxide (100 Mc.): apart from the signals that are characteristic of the 7-ACA a singlet is found at δ=4.92 p.p.m. which can be assigned to the —$CH_2$ group of the aminotetrazolylacetyl residue and singlet with broad base is found at δ=6.7 p.p.m. for the $NH_2$ group at the carbon atom of the tetrazole ring. Mice infected with a lethal dosis of *Staphylococcus aureus* survive if they are given 2 (mg./kg.) of the product twice subcutaneously. The $LD_{50}$ (dosis which kills 50% of the animals) for mice on 2 subcutaneous administrations of the product, is more than 300 mg./kg.

EXAMPLE 2

9.42 g. of 3-(desacetoxymethyl)-3-benzoylthiomethyl-7-bromacetylamino-cephalosporanic acid are dissolved in 60 ml. of dimethylformamide with the addition of 7.0 ml. of N,N - diisopropylethylamine. A solution of 2.46 g. of 5-aminotetrazole monohydrate in 20 ml. of dimethylformamide is added. The solution is rinsed down with 13 ml. of dimethylformamide.

After the reaction mixture has been left to stand for 36 hours at room temperature, the solvent is distilled off against a cooler of −60° C. under 0.3 mm. pressure of mercury. The remaining oil is introduced into a thoroughly stirred two-phase system of 500 ml. of ethyl acetate and 250 ml. of phosphate buffer of pH 6.5. By the addition of a little 2 N sodium carbonate solution the aqueous phase is then adjusted to pH 6.5. The phases are separated immediately and the aqueous phase is extracted again with 20 ml. of ethyl acetate. The organic phases are washed in turn with 50 ml. of phosphate buffer of pH 6.5 and discarded.

The combined aqueous solutions are immediately covered with 500 ml. of ethyl acetate and the pH value is adjusted to 2 by the addition of 2 N hydrochloric acid while stirring vigorously. A precipitate formed during this operation can be removed by filtration. After separation of the phases the aqueous solution is saturated with sodium chloride and post-extracted with 300 ml. and 200 ml. of ethyl acetate. The organic phases are washed in turn twice with 50 ml. of saturated sodium chloride solution each time, dried with sodium sulphate and filtered through a column (diameter 4.5 cm.) of 60 g. of silicagel. The collected filtrate is evaporated in vacuo, the residue dissolved in 30 ml. of tetrahydrofuran and enough methanol added (about 100 ml.) to bring about slight coloration. By gentle heating in an airbath and blowing with a nitrogen stream the solution is slowly concentrated, crystalline 3-(desacetoxymethyl) - 3 - benzoylthiomethyl - 7 - [5-aminotetrazolylacetylamino] - cephalsporanic acid is obtained; M.P. 190–193° C. (with decomposition).

$Rf_{52}=0.40$, $Rf_{A101}=0.55$
U.V. spectrum (in 0.1 mol of sodium bicarbonate): $\lambda_{max.}$ at 240 m$\mu$ ($\epsilon$=16,500) and at 276 m$\mu$ ($\epsilon$=19,000)

The starting material may be prepared as follows: A solution of 17.5 g. of 3-(desacetoxymethyl)-3-benzoylthiomethyl)-7-aminocephalosporanic acid (cf. Belgian Pat. 650,444) and 12.5 ml. of triethylamine in 1 litre of dimethylformamide is added dropwise in the course of 1 hour into a well stirred solution of 9.2 ml. of bromoacetyl bromide in 100 ml. of methylene chloride at −13° C. to −15° C. (in a nitrogen atmosphere). The temperature is allowed to rise slowly to 10° C. in the course of 1½ hours and is maintained at 10° C. for half an hour. The major part of the solvent is then distilled off in vacuo under 0.5–1 mm. of mercury against a cooler of solid carbon dioxide+acetone. The oily product is poured onto a phosphate buffer of pH 6 and agitated with 1 litre of ethyl acetate. A precipitate is produced at the interface of the two phases and is separated off by filtration or centrifugation. The pH of the aqueous phase is then adjusted to 2, the aqueous phase saturated with sodium chloride, and the organic phase separated off. The aqueous phase is post-extracted with 600 and 400 ml. of ethyl acetate. After washing with saturated sodium chloride solution the organic phases are dried over sodium sulphate and filtered in turn through a column of 100 mg. of silica gel. The filtrates are concentrated to dryness in vacuo and the residue treated with 30 ml. of ethanol and crystallized out at −20° C. 7.8 g. of 3 - (desacetoxymethyl)-3-benzoylthiomethyl-7-bromacetylamino-cephalosporanic acid melting at 137–138° C. are obtained.

$Rf_{52}=0.55$. The sodium salt shows the following maxima in the U.V. spectrum in water: $\lambda_{max.}$ 243 m$\mu$ ($\epsilon$=16,800) and $\lambda_{max.}$ 275 m$\mu$ ($\epsilon$=20,600)
$[\alpha]_D^{20}=-47\pm1°$ (c.=1; in 0.1 molar sodium bicarbonate+acetone (1:1).

EXAMPLE 3

2.51 g. of 3-(desacetoxymethyl)-3-benzoylthiomethyl-7-[5 - aminotetrazolyl-acetylamino]-cephalosporanic acid are dissolved in 41.5 ml. of a mixture from equal parts of dioxan and pyridine, treated with 12.2 ml. of aqueous mercury perchlorate solution of 40% strength and allowed to react under nitrogen for 45 minutes at 45° C. and 45 kilocycles per second ultrasound. The batch is allowed to cool, is treated with 6.5 ml. of thiobenzoic acid and agitated for 5 minutes. The solvents are distilled off in vacuo and a solution of the residue in 65 ml. of water filtered off through "Celite." The filtrate is washed in succession with 50 ml. of toluene, twice with 33 ml. of "Amberlite" LA–2 in 66 ml. of toluene each time, and twice with 50 ml. of toluene each time. The aqueous phase is then filtered through a column that contains from the bottom to the top 4.1 ml. of "Sephadex" CM C–25 (H⁺ form), 16.5 ml. of "Alox," 4.1 ml. of "Zeo-Karb" 226 (H⁺ form), 16.5 ml. of "Alox," 4.1 ml. of "Dowex 1" (acetate form) and 4.1 ml. of "Sephadex" CM C–25 (H⁺ form). The "Celite," organic phases and the column are twice post-extracted with 15 ml. of water each time and the column additionally eluted with an additional 150 ml. of water. The combined eluates are concentrated in vacuo, a small amount of precipitate is removed by filtration and the filtrate evaporated to dryness. The residue is digested with about 50 ml. of absolute ethanol and yields pure 3-(desacetoxymethyl)-3 - pyridinio-methyl - 7 - [5-amino-tetrazolyl-acetylamino]-cephalosporanic acid.

$[\alpha]_D^{20}=+60°\pm1°$ (c.=1 in water)
U.V. spectrum: $\lambda_{max.}$ 256 m$\mu$ ($\epsilon$=11600); $Rf_{52}=0.01$; $Rf_{101A}=0.10$ NMR spectrum in deutero-dimethylsulphoxide (100 mc.): Apart from the signals that are characteristic of the basic substance, a singlet is found at $\delta$=4.96 p.p.m. which can be assigned to the —$CH_2$ group of the aminotetrazolyl acetyl residue and a singlet with broad base at $\delta$=6.76 p.p.m. for the —$NH_2$ group at the carbon atom of the tetrazole ring.

MIC: St. aureus SG 511=0.075 $\lambda$/ml.; Bac. subt.=0.55 $\lambda$/ml.; Bac. megath.=30 $\lambda$/ml.; E. coli 2018=30 $\lambda$/ml.; Kl. pneum.=60 $\lambda$/ml.; Salm. typh.=30 $\lambda$/ml.

EXAMPLE 4

A solution of 10.8 g. of the sodium salt of 7-(5-aminotetrazolyl)-acetyl-amino-cephalosporanic acid in 300 ml. of water is warmed to 37° C. and the pH adjusted to 7.6 with 0.2 N-sodium hydroxide solution. After that, a suspension of 240 mg. of acetyl esterase (from Bacillus subtilis ATCC 6633, cf. Belgian Pat. 1,080,904) in 5 ml. of water is added, and the acetic acid formed is currently neutralized with 0.2 N sodium hydroxide solution (adjustment to pH 7.6, temperature 37° C.). After 5 hours the reaction is complete. The pH value is adjusted to 6.5, the solution is filtered through a G4 glass suction filter, and lyophilized. There are obtained 11.88 g. of a yellowish resin of 7-(5-amino-tetrazolyl)-acetylamino-O-desacetyl-cephalosporanic acid.

9.92 g. of this crude product are suspended in 150 ml. of absolute dimethylformamide and the suspension treated with 0.15 ml. of $(Bu_3Sn)_2O$ (tributyl tin oxide). In the course of 15 minutes, a solution of 10.6 ml. of $\beta$-chlorethylisocyanate in 45 ml. of dimethylformamide is then added dropwise, and the batch is stirred for another 75 minutes. The reaction mixture is filtered, and the filtrate is evaporated under a high vacuum. The resin-like residue is triturated three times with 500 ml. of absolute ether each time (the ether-soluble portion is separated and discarded), and then dissolved in 250 ml. of 10% phosphate buffer of pH 6.7. The batch is extracted first with 1.5 liters and then with 0.5 liter of ethyl acetate. The organic phases are extracted back with 2× 100 ml. of buffer of pH 6.7 and the discarded. The aqueous phases are combined covered with 1.5 liters of ethyl acetate, adjusted to pH 2.4 by adding 2 N-hydrochloric acid and agitating, and the phases then separated. After saturation with sodium chloride the aqueous phase is extracted with 2× 1 liter of ethyl acetate, the organic phases are washed successively with 2× 200 ml. of saturated sodium chloride solution, dried with sodium sulfate, and evaporated to dryness under reduced pressure. There are obtained 8.0 g. of an amorphous residue from which a crude crystallizate of the sodium salt can be obtained with sodium-α-ethylhexanoate. The crude crystallizate is reconverted into the crystalline acid by acidification and extraction with ethyl acetate. From this, the pure, crystalline sodium salt of O-desacetyl-O-(β-chlorethyl-carbamoyl) - 7 - [(5 - aminotetrazolyl)-acetylamino]-cephalosporanic acid can be obtained in the afore-described manner.

U.V. spectrum $\lambda_{max.}$ 258 mn. ($\epsilon$=8,500). Optical rotation $[\alpha]_D^{20}$=+116°±1°. Thin-layer chromatogram on silica gel: $Rf_{52}$=0.23, $Rf_{101A}$=0.5

MIC: *St. aureus* SG 511=0.45 λ/ml.; *Bac. subt.*=0.1 λ/ml.; *Bac. megath.*=25 λ/ml.; *E. coli* 2018=2.5 λ/ml.; *Kl. pneum.*=1 λ/ml. *Salm. typh.*=2 λ/ml.

We claim:
1. A compound of the Formula I

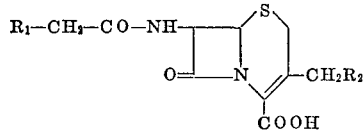

in which $R_1$ represents the 5-aminotetrazolyl group and $R_2$ represents benzoylthio, or N- lower alkyl-, N-lower alkoxyloweralkyl or N-halo-lower alkyl-carbamoyloxy group in which the oxygen atoms may be replaced by sulfur, or a therapeutically useful salt thereof.

2. A compound of the Formula I as claimed in claim 1, wherein $R_2$ represents a lower alkyl carbamoyloxy group, or a therapeutically useful salt thereof.

3. A compound of the Formula I as claimed in claim 1, wherein $R_2$ represents a carbamoyloxy group of the formula

—O—CO—NH—$R_3$ in which $R_3$ represents a lower alkyl residue substituted by one or more than one lower alkoxy groups or halogen atoms, or a therapeutically useful salt thereof.

4. A compound of the Formula I as claimed in claim 1, wherein $R_2$ represents a carbamoyloxy group of the formula

—O—CO—NH—$R_3$ wherein $R_3$ represents a lower alkyl residue substituted by one or several chlorine atoms, or a therapeutically useful salt thereof.

5. A compound of the Formula I as claimed in claim 1, wherein $R_2$ represents the β-chlorethylcarbamoyloxy group, or a therapeutically useful salt thereof.

References Cited

UNITED STATES PATENTS

| | | | |
|---|---|---|---|
| 3,468,874 | 9/1969 | Raap et al. | 260—243 C |
| 3,157,648 | 11/1964 | Collins | 260—243 C |
| 3,530,123 | 9/1970 | Takano et al. | 260—243 C |

NICHOLAS S. RIZZO, Primary Examiner

U.S. Cl. X.R.

424—246